United States Patent [19]
Greene

[11] 4,180,354
[45] Dec. 25, 1979

[54] PNEUMATIC TRANSMISSION SYSTEM

[76] Inventor: Harold R. Greene, 2617 Tarna, Dallas, Tex. 75229

[21] Appl. No.: 860,744

[22] Filed: Dec. 15, 1977

[51] Int. Cl.$^2$ ............................................. B65G 51/34
[52] U.S. Cl. ...................................... 406/112; 406/79; 406/82
[58] Field of Search ...................... 243/1, 2, 19, 24, 38; 302/23

[56] References Cited

U.S. PATENT DOCUMENTS

| | | | |
|---|---|---|---|
| 2,698,721 | 1/1955 | Van Otteren | 243/19 |
| 3,761,039 | 9/1973 | Hazell | 243/19 |
| 3,778,006 | 12/1973 | Martin | 243/19 |

FOREIGN PATENT DOCUMENTS

| | | | |
|---|---|---|---|
| 1192981 | 5/1965 | Fed. Rep. of Germany | 243/19 |
| 641054 | 12/1963 | France | 243/24 |
| 1481582 | 5/1967 | France | 243/24 |

Primary Examiner—James L. Rowland
Attorney, Agent, or Firm—Gerald G. Crutsinger; Harry C. Post, III

[57] ABSTRACT

A pneumatic transmission system adapted to send a carrier from one terminal to a second terminal with apparatus to control the free delivery of the carrier to a terminal comprising a check valve to relieve pressure behind a carrier once it has passed a check valve and an adjustable air valve to control the negative pressure ahead of the carrier to control the free delivery of the carrier from the end of the transmission tube in a single tube reversing system with negligible amount of air being taken into or discharged from the open terminal.

5 Claims, 1 Drawing Figure

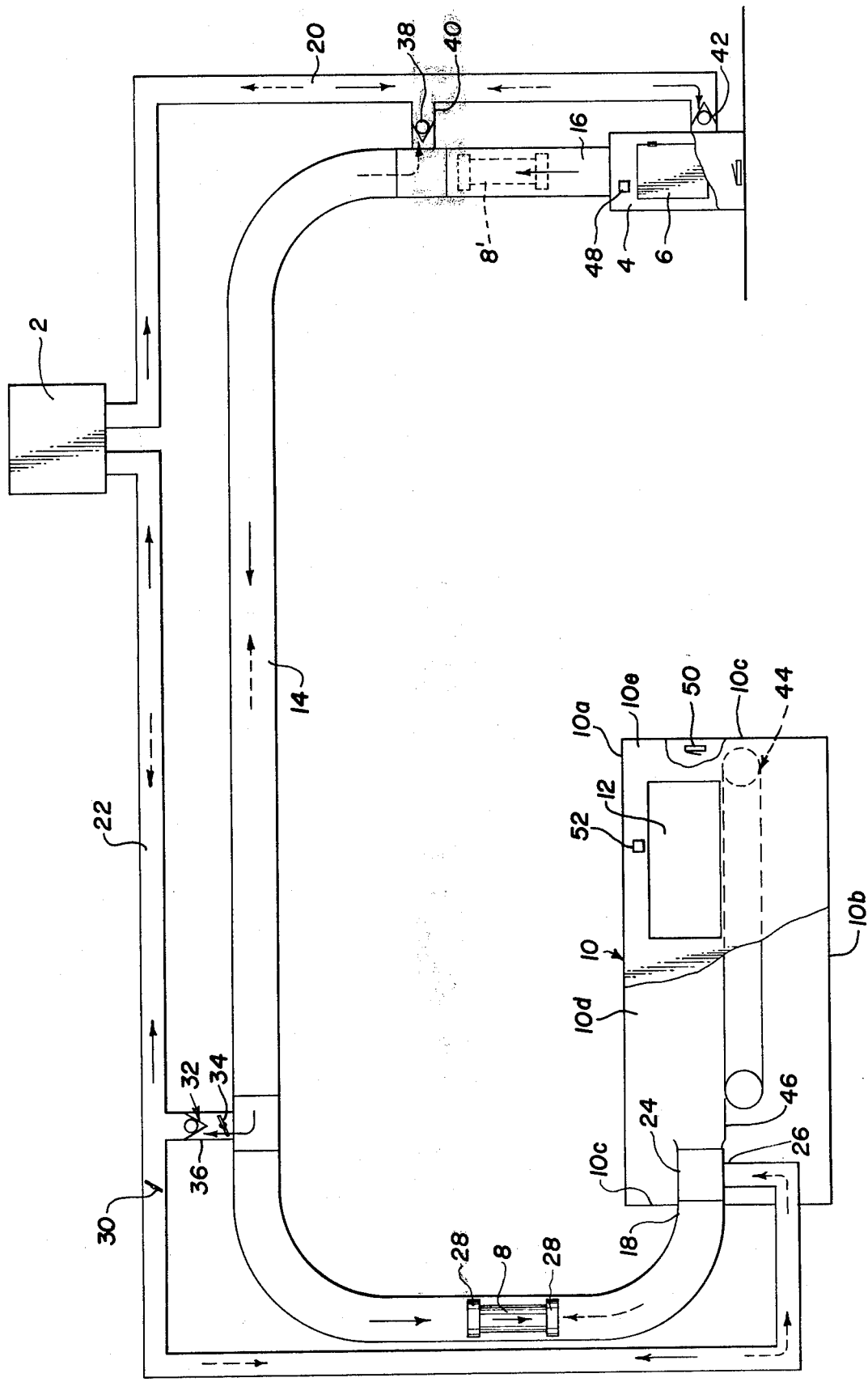

PNEUMATIC TRANSMISSION SYSTEM

BACKGROUND

Pneumatic transmission systems are widely used to transmit articles and written information from one place to a remote location. The devices comprise both single and twin tube types in which the carrier is impacted against an end object at the end of the travel. This is undesirable in that the impact subjects the carrier and the terminal to needless wear and tear. In single tube systems it is undesirable to intake or discharge air from the end terminal.

Attempts to control the impact has generally been in the area of sensor switches which open and close various valves to control the air pressure or to deliver into a box with a door on it with carrier deceleration against a dead column of air. These are expensive to install and maintenance is required often because of the location and nature of the carrier moving through the transmission tube at a speed of approximately 25 feet per second. Other types of systems have utilized a closed carrier terminal at both ends in which a door must be opened in order to allow removal of the carrier from the terminal box. This is undesirable in that it requires more moving parts and more technical expertise in operating the device. It is undesirable to discharge or intake air into a transmission line because the warm air moving into the line causes condensation to develop. In addition, open lines to discharge the air create noise. Air is ejected into the building and heating or air conditioning problems occur.

SUMMARY

I have devised a single pneumatic tube transmission system for transmitting a carrier from one terminal to a remote terminal to allow controlled or regulated delivery of the carrier into an open remote terminal to prevent impact of the carrier with the end of the terminal and to eliminate the intake or discharge of air from the open end. The system comprises a blower for creating positive and negative pressures, a first terminal, and a second remote open terminal. A transmission line communicates between the first terminal and the open terminal. A first air line communicates between one side of the blower and the first terminal thereby communicating with the first end of the transmission line. The second air line communicates with the other side of the blower and the second end of said transmission line which terminates in the open remote terminal unit. An adjustable air valve is positioned in the second line to control flow of air therethrough. Further, a check valve communicates between the transmission line and the second air line in close proximity to the second end of the transmission line at a distance to allow deceleration. The check valve allows flow of air from the transmission line to the air line to prevent flow from the air line to the transmission line. An air valve is located between the check valve and the air line to allow air flow adjustment.

When the carrier is being transferred from the first terminal to the remote terminal, the carrier is positioned in the first terminal and the blower is activated to deliver positive pressure air through the first air line and draw a partial vacuum on the second air line thereby drawing a partial vacuum on the second end of the transmission line. This forces the carrier to move through the line at full speed until the carrier passes the check valve adjacent the end of the transmission line. As the carrier passes the check valve, part of the positive pressure is relieved through the check valve and the negative pressure is controlled by the adjustable air valve to control the rate of movement through the last portion of the transmission line to the remote terminal thereby controlling how far the carrier will be ejected from the second end of the transmission line. The carrier is preferably ejected to the open area of the remote terminal where the end of the carrier will contact a stop switch.

To reverse the procedure of sending the carrier from the remote unit to the first terminal the carrier is positioned on a conveyor which delivers the carrier to the second end of the transmission line or the carrier may be manually placed into the open end. The blower is reversed to deliver positive air to the second air line and draw a partial vacuum on the first air line. The carrier is drawn into the transmission line by the partial vacuum ahead of the carrier and the positive pressure behind the carrier to force the carrier through the transmission line. Positive pressure will be relieved through a second check valve into the first air line and a dead column of air will exist between the carrier and the first terminal. The air will escape around the seals allowing the carrier to descend at a slow rate thus preventing a full speed impact with the terminal.

The primary object of the invention is to regulate the free delivery into an open terminal of a carrier in a pneumatic transmission system.

A further object of the invention to regulate the deceleration of carrier speed without reversing the flow of air while the carrier is in transit.

A further object of the invention is to provide apparatus to regulate the termination of the carrier in a pneumatic transmission system without utilizing sensors which close and open valves.

A further object of the invention is to allow free access to a capsule in an open terminal and provide an economical manner of transmitting and controlling the deceleration and acceleration of a carrier between a first terminal and a remote terminal.

Other and further objects of the invention will become apparent upon studying the detailed description hereinafter following and the drawings annexed hereto.

BRIEF DESCRIPTION OF THE DRAWING

A drawing is annexed hereto so that the invention may be better and more fully understood, in which:

The drawing comprises a diagrammatic illustration of the transmission system with portions of the diagrammatic view broken away to more clearly illustrate the details of construction.

Numeral references are employed to designate elements of the invention within the drawing.

BRIEF DESCRIPTION OF A PREFERRED EMBODIMENT

Generally referring to the drawing numeral 2 designates a means to control air pressure generally comprising a suitable blower having a reversible motor. A first terminal 4 generally comprises a sealed unit having a door 6 for inserting a carrier 8. An open remote terminal 10 has an opening 12 for withdrawing and inserting carrier 8. The remote terminal 10 generally comprises a rectangular box unit having a top 10a, a bottom 10b, sides 10c, a back 10d and front 10e. A transmission line 14 has a first end 16 which communicates with one end of first terminal 4 and a second end 18 which communicates with the remote terminal 10 through side 10c.

A first air line 20 communicates with terminal 4 and one side of blower 2. A second air line 22 communicates between the other side of the blower 2 and end 18 of transmission line 14 adjacent remote terminal 10. A tee 24 connects the end 26 of second air line 22 to the second end 18 of transmission line 14.

The carrier 8 generally has annular disc shaped seals 28 on each end. Seals 28 have an outside diameter generally equal to the diameter of transmission line 14. The seals 28 are usually constructed of leather or the like and are approximately 85% effective allowing some passage of air around the carrier 8. The carrier 8 comprises a hollow tube having access means to allow placing objects inside the tube. The access means generally is a hinged door on the side or a removable top on the end of the tube.

An adjustable air valve 30 is pivotally secured in the second air line 22 control the rate of flow of air between end 26 of transmission line 14 and check valve 32. The adjustable air valve 30 is manually adjustable to a predetermined position and locked in place by a screw or other means not shown in the drawing.

A first check valve 32 is positioned between transmission line 14 and second air line 22 to permit the flow of pressurized air from transmission line 14 into second air line 22. A second adjustable air valve 34 may be placed adjacent first check valve 32 to provide a means to control the flow of air between the transmission line 14 and second air line 22, when deemed necessary. The check valve 32 and adjustable air valve 34 are positioned in a short section of conduit 36 communicating between transmission lines 14 and air line 22.

A second check valve 38 is positioned in a short conduit communicating between first air line 20 and transmission line 14 to permit flow of air from transmission line 14 to the first air line 20. A third check valve 42 is positioned between terminal 4 and first air line 20 to prevent air from passing from the terminal 4 into the air line 20.

First check valve 32 and second check valve 38 are preferably positioned in close proximity to the ends 16 and 18, respectfully, of transmission line 14 to control the rate of deceleration of carrier 8. A position which is found to work well with pneumatic systems which move the carrier at a rate of 25 feet per second is nine feet from the end of the transmission line 14; however, it should be appreciated that the distance may vary depending on the speed, size and weight of the carrier 8.

Remote terminal 10 has a reversible conveyor 44 which is adapted to carry the carrier 8 from the end 18 of transmission line 14 to the opening 12 of the remote terminal 10. Landing 46 provides a bridge between end 18 of transmission line 14 and conveyor 44.

Operation of the hereinbefore described invention is as follows:

To move the carrier 8 from the first terminal 4 to the remote terminal 10 the carrier is positioned in the terminal 4 and door 6 closed. Switch 48 is energized to actuate blower 2 such that a positive pressure is applied to the first air line 20 and a partial vacuum or negative pressure applied to the second air line 22 causing the flow of air to be in a direction shown by the solid arrows. The positive pressure air flows through first air line 20 through check valve 42, opening same, and forces the carrier 8 into the transmission line 14. The seals 28 sealing with the inside wall of transmission line 14 causes positive pressure to push the carrier 8 along transmission line 14. In addition, the negative pressure is drawn through transmission line 14, adjustable air valves 30 and 34, second air line 22 into the blower 2. As the carrier 8 approaches the end 18 of transmission line 14, the carrier 8 passes check valve 32. At this position, excessive positive pressure is released through check valve 32 into the second air line 22 having a partial vacuum drawn thereon by blower 2. Evacuation of the remainder of transmission line 14 is controlled by adjustable air valve 30 which has been permanently adjusted to a position to decelerate carrier 8. When the carrier 8 reaches the end 18 of transmission line 14, the carrier 8 will be ejected only a small distance, such as ten inches, to where it will lie on the conveyor 44 or platform and be moved to the opening 12 of remote terminal 10.

Upon reaching the opening 12 the end of carrier 8 will engage limit switch 50 to de-energize blower 2. It should be readily appreciated that without deceleration of the carrier 8, the carrier 8 would be ejected from the end 18 of line 14 and hit the end of terminal 10.

The negative pressure in line 22, controlled by valve 30, prevents the slight positive pressure at end 18 from being spilled into terminal 10. Air does not flow either in or out of tee 24. By controlling the evacuation of air at the end 18 of transmission line 14 one can control the deceleration rate of carrier 8 and therefore the distance it will be ejected from transmission line 14 into terminal 10.

This same controlled deceleration is accomplished in a horizontal tube run of transmission line 14. Gravity is not required for controlled delivery at the end 18 of tube 14. Further, it should be appreciated that a separate blower of equal size and strength to blower 2 may be used to control air pressure within second air line 22. This would be necessary where a pneumatic system or terminals 4 and 10 are located some distance apart.

To reverse the carrier 8 and send it from remote carrier 10 to terminal 4 one would activate the send button 52 which reverses conveyor 44 to move the carrier 8 into end 18 of transmission line 14. Until the carrier 8 enters transmission line 14, the blower 2, which is simultaneously activated by button 52, acts as a closed system in which the negative pressure will follow the positive pressure. After the seals 28 of carrier 8 pass tee 24, a negative or reduced pressure is drawn through first air line 20 and tube 14 in a direction shown by the arrows in dashed outline, to move carrier 8 along transmission line 14 toward terminal 4. Because the pressure in second air line 22 and transmission line 14 will be the same, check valve 32 will not open as the carrier 8 passes. The carrier 8 will move to a distance in close proximity to the end 16 of transmission line 14 where it will pass second check valve 38. The negative or reduced pressure will be relieved through second check valve 38 into first air line 20 which has a negative pressure formed therein, thus producing the pulling force behind carrier 8' shown in dashed outline. Because the third check valve 42 will be closed, a column of air will be formed and trapped below the carrier 8' in tube 14 and terminal 4. As the seals 28 are only 85% efficient the column of air will begin to flow around the carrier 8 allowing the carrier 8 to move to the terminal 4 where it may be removed.

It should be readily appreciated that by using the check valves and the adjustable air valves as shown of the transmission line and controlling the rate of flow from the end of the line as the carrier 8 reaches end of the line 14, one can control the rate of deceleration and therefore the delivery of the carrier 8 into the terminal 10. This eliminates the necessity of having electronic microswitches within the transmission line 14 to sense the position and to cause deceleration of the blower 2 and thereby permitting use of open terminal 10.

It should be readily apparent that the invention accomplishes the objects of the invention as hereinbefore discussed.

It should further be appreciated that other and further embodiments of the invention will be devised without departing from the basic concept of the claims annexed hereto.

Having described my invention, I claim:

1. A free delivery transmission system to move a carrier comprising: a closed terminal adapted to receive a carrier; a reversible blower adapted to supply pressurized air to an outlet and draw a partial vacuum at an inlet; a transmission line having a first end connected to the closed terminal and a second open end spaced from said closed terminal; a first air line extending between the outlet of the blower and the closed terminal; a second air line extending between inlet of the blower and the transmission line adjacent the open end of the transmission line; adjustable valve means positioned in said second air line to adjust the flow of air between the transmission line and the second air line; a conduit extending between a position spaced from the open end of the transmission line and the second air line; and a check valve in said conduit means adapted to release pressurized air from the transmission line to the second air line as the carrier nears the end of the transmission line such that the rate of deceleration of the carrier is controlled by the flow of air through the second air line.

2. The combination called for in claim 1 wherein the carrier is a hollow tubular member, said tubular member having an opening to allow access to the inside; closure means to cover said opening; and seal means on the ends of said tubular member to seal with said transmission line.

3. The combination called for in claim 1 with the addition of: a second check valve positioned between said transmission line and first air line in close proximity to the closed terminal, said second check valve preventing flow of air from the first air line to the transmission line; and a third check valve secured in the first air line to prevent flow of air from the closed terminal to the first air line such that as the carrier passes the second check valve moving toward the closed terminal, a column of air is formed between the carrier and closed terminal to decelerate the carrier.

4. A pneumatic transmission system for free deliver of a carrier from the system comprising: a terminal; a closure on said terminal being adapted to allow placement of a carrier in the terminal; a transmission tube having a first end communicating with said terminal and a second open end spaced from said terminal; air supply means being adapted to supply pressurized air and to supply a partial vacuum; a first line communicating between said air supply means and said terminal; a first check valve in said first line being adapted to allow pressurized air from said air supply means to flow into said terminal; a second check valve in communication between said transmission line and said first air line being adapted to open when a partial vacuum from said air supply means is applied to said first air line; a second air line having a first end communicating with said air supply means and a second end communicating with the transmission tube immediately adjacent said second open end; a third check valve in communication between said second air line and said transmission tube, said third check valve being positioned a predetermined distance from said second open end of said transmission tube and being adapted to open when a partial vacuum is applied to said second air line by said air supply means; and a control valve positioned in said second air line between said third check valve and said second end of said second air line being adapted to control the flow of pressurized air between said third check valve and said second open end of said transmission tube such that the air pushing a carrier through said transmission tube is controlled to allow deceleration of the carrier prior to exiting the second open end of the transmission tube.

5. A free delivery transmission system to move a carrier comprising: a terminal which is open to ambient atmosphere; a transmission line having an open end communicating with said terminal; a reversible blower adapted to supply pressurized air to an outlet and to draw a partial vacuum at an inlet; a return line connected between the inlet of the blower and the transmission line at a location remote from said terminal such that a partial vacuum is formed in the transmission line to move a carrier away from said terminal; and a supply line connected between the outlet of the blower and the transmission line adjacent the open end of the transmission line such that air from said supply line will maintain pressure in said transmission line at or above atmospheric pressure to prevent flow of ambient air from said terminal into said transfer tube.

* * * * *